May 27, 1947.     C. H. WHITE     2,421,306
DISK HARROW AND BEARING THEREFOR
Filed Aug. 4, 1944     2 Sheets-Sheet 1

INVENTOR.
CHARLES H. WHITE

WITNESS

ATTORNEYS

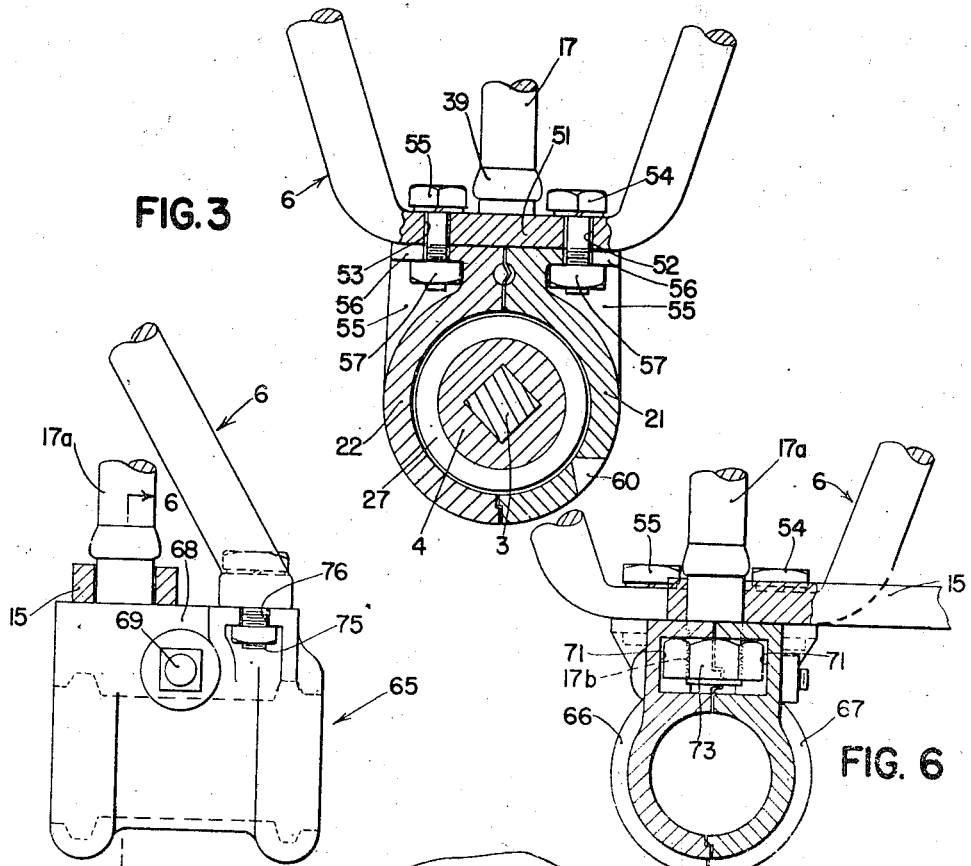
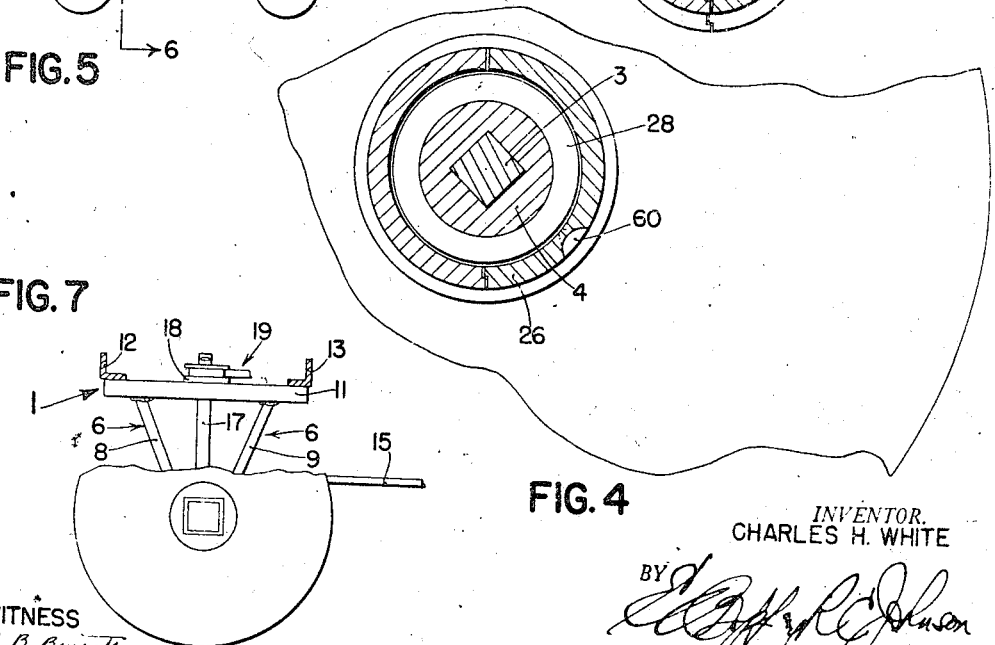

Patented May 27, 1947

2,421,306

UNITED STATES PATENT OFFICE 2,421,306

DISK HARROW AND BEARING THEREFOR

Charles H. White, Moline, Ill., assignor to Deere & Company, Moline, Ill., a corporation of Illinois Application August 4, 1944, Serial No. 548,055

17 Claims. (Cl. 97—220)

The present invention relates generally to agricultural implements and more particularly to disk harrows and the like.

The object and general nature of the present invention is the provision of a new and improved bearing structure for disk harrows and similar implements. The principal feature of the present invention is the provision of a bearing structure which does not require any drilling or machining of parts but which nevertheless provides for a convenient and adequate connection with the parts with which the bearing structure is associated. More specifically, it is a feature of this invention to provide a bearing structure that includes a two-part bearing sleeve, each part having a recess which, when the bearing sleeve parts are assembled, provides for a socket in which a part to be associated with the bearing may be disposed and held in place therein merely by assembling the two bearing parts together and holding them in assembled relation, thereby eliminating any tapping or other machining operation. Further, it is a feature of the present invention to provide a bearing structure in which a part associated with the bearing is normally held in place by the means that clamps the two bearing sections together, in connection with auxiliary means for also holding the two bearing parts together so as to permit the clamping means to be removed in the process of assembling and disassembling the member that is associated with the bearing structure.

These and other objects and advantages of the present invention will be apparent to those skilled in the art after a consideration of the following detailed description, taken in conjunction with the accompanying drawings in which the preferred forms of the invention have been illustrated.

Figure 1:
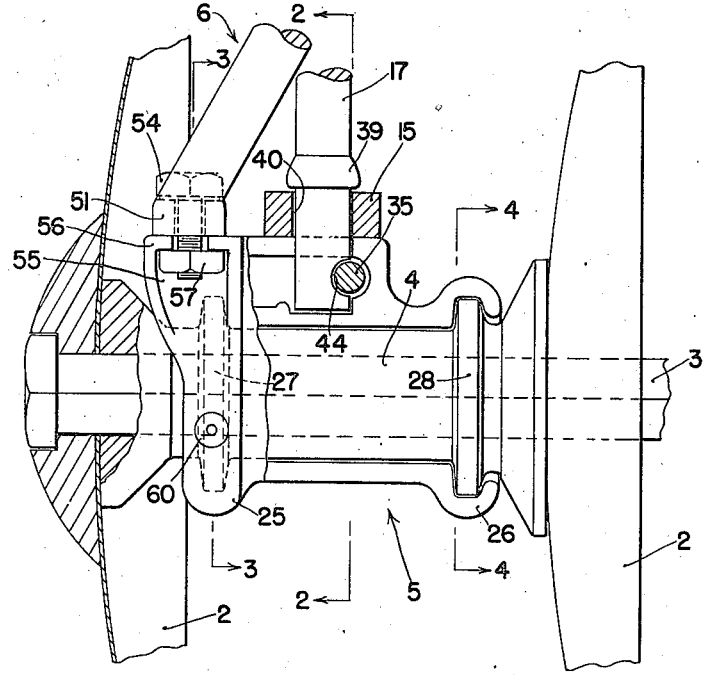
Figure 1 is a fragmentary view of a disk harrow bearing in which the principles of the present invention have been incorporated.

Figures 3 and 4 are sectional views taken generally along the lines 3—3 and 4—4, respectively, of Figure 1.

Figure 5 is a side view of a modified form of the present invention.

Figure 6 is a sectional view taken generally along the line 6—6 of Figure 5.

Figure 7 is a sectional view taken through one end of a disk harrow gang, showing the relation between the bearing structure and the disk gang frame.

Figure 2:
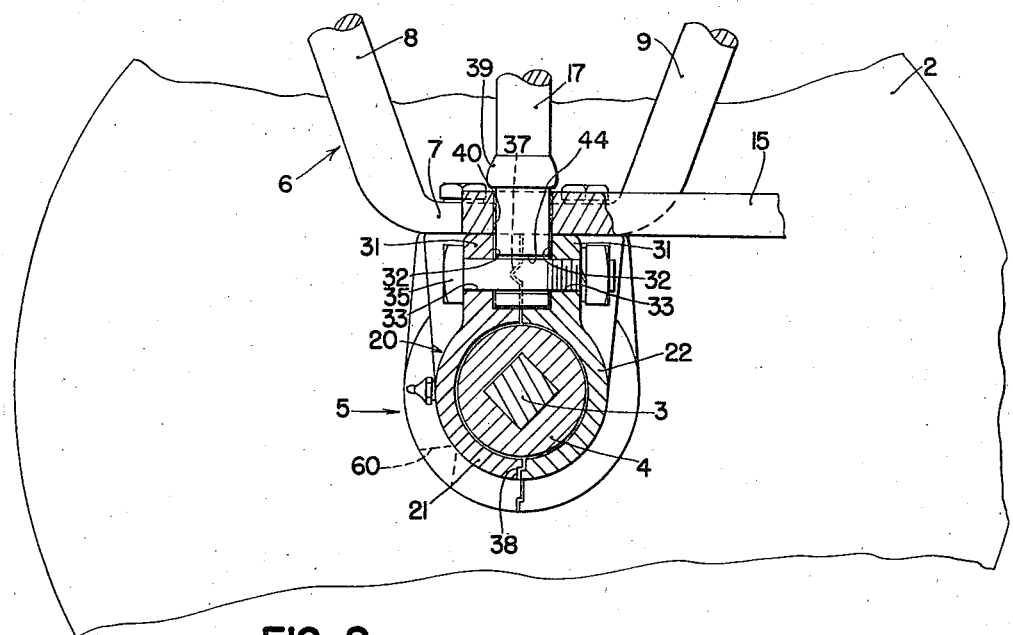
Figure 2 is a sectional view taken generally along the line 2—2 of Figure 1.

Referring first to Figures 1, 2 and 7, the disk harrow in which the principles of the present invention have been incorporated, comprises a gang frame 1, a gang of disks 2 mounted on a gang bolt 3 held in spaced apart relation by bearing spools 4. The bearing structure, with which the present invention is more particularly concerned, is indicated in its entirety by the reference numeral 5 and will be described below in detail. The bearing structure is attached to a bracket 6 comprising a U-shaped member having a central portion 7 and upwardly and outwardly extending arm sections 8 and 9, the upper ends of which are secured, as by welding, to a cross bar 11 forming a part of the gang frame 1. The latter also includes angles 12 and 13.

Normally, draft is applied directly to the bearing structure 5, as by means of a draft member 15 apertured at its rear end, as at 40, to receive a draft pin 17. The latter extends upwardly through an apertured plate 18 (Figure 7) fixed to the cross bar 11 and, at the inner end of the gang, receives a bell crank member 19. A similar construction is found at the outer end of the disk gang except that the upper end of the draft pin 17 receives an auxiliary draft or bracing angle member (not shown) in place of the bell crank 19. The latter member is similar to the bell crank shown in my prior United States Patent 1,941,504, issued August 28, 1934, to which reference may be made if necessary. Ordinarily a disk harrow comprises at least two disk gangs and associated frames, sometimes referred to as scraper frames since the scrapers for the disks are carried by the frame, and these disk gangs including the frames are shipped to the dealer or farmer as separate assemblies, together with a third assembly which comprises the draft connections, including the bar 15 and the bell crank 19 or the part similar thereto that is connected to the upper end of the pin 17 at the outer side of the disk. When the farmer or dealer receives the disk harrow it is, of course, necessary to assemble the same, and in doing so it is necessary to remove the pin 17 from the bearing 5 in order to connect the associated draft member thereto. The present invention is particularly concerned with a bearing structure which facilitates the attachment and detachment of the draft receiving pin 17, especially in connection with a type of bearing in which the bearing parts are made of an exceedingly hard metal that cannot ordinarily be tapped or milled. The bearing structure with which the present invention is more particularly concerned and which will be described below, is therefore particularly constructed to provide a ready attachment and detachment of the draft receiving pin 17 as well as other improvements in the bearing itself.

Referring first to Figures 1 and 2, the bearing structure 5 includes the bearing spool 4 mentioned above, and a bearing sleeve structure 20 which is made up of two mating or complementary parts 21 and 22. The bearing sleeve 4 as well as the two bearing parts 21 and 22 preferably are made of white iron, an alloy that is exceedingly hard and resistant to wear. Each bearing half, 21 or 22, includes recessed flanges 25 and 26 to accommodate ribs or flanges 27 and 28 formed on the end portions of the bearing spool 4 for the purpose of taking end thrust loads. Also, each bearing half, 21 and 22, is provided with an upper section 31 in which a recess 32 is formed. Also, through holes 33 extend transversely through these sections to receive a clamping bolt 35 that, as best shown in Figure 2, normally holds the two parts 21 and 22 of the bearing sleeve 20 together and constitutes, in effect, the main clamping member. Preferably, the two bearing parts 21 and 22 are provided with grooved mating surfaces, indicated at 37 and 38, to facilitate the maintenance of the proper bearing surface for the bearing spool 4.

The lower end of the draft receiving pin 17 is adapted to seat in the socket formed by the two recessed sections 32, as best shown in Figures 1 and 2, the pin 17 having a shouldered section 39 adjacent its lower end receiving the aperture 40 formed in the rear end of the draft member 15, which overlies the bearing 5, as best shown in Figures 1 and 2. The draft pin 17 is held in place in the socket 32, 32 by virtue of having a recess 44 formed in the lower end of the pin 17, in which recess the clamping member 35 is disposed, as best shown in Figure 1. As long as the clamping bolt 35 is in position, Figure 1, the pin 17 is held against displacement, but if the clamping bolt 35 is removed, the pin 17 may be readily lifted out of the bearing. However, in order to prevent disassembly of the bearing parts by the removal of the clamping bolt 35, means is provided, according to the principles of the present invention, in the nature of auxiliary clamping means for holding the two parts of the bearing sleeve member 20 together when it is desired to remove the main clamping bolt 35. To this end, the frame supporting bracket 6 is flattened at its central section, as indicated at 51, and is provided with a pair of apertures 52 and 53 in which attaching bolts 54 and 55 are disposed. The upper extensions 31 of the two bearing parts 21 and 22 are provided with recesses 55 which, at their upper sides, are formed with open end slots 56 into which the bolts 54 and 55 may be extended. The recesses 55 are shaped so as to receive the nuts 57 associated with the bolts 54 and 55 and to prevent the nuts from turning when the bolts 54 and 55 are turned. Ordinarily the bracket 6 is assembled on the bearing 5 at the factory, and thus the bolts 54 and 55 clamp both parts 21 and 22 of the bearing sleeve 20 to the frame bracket 6 whereby the removal of the main clamping bolt 35 (Figures 1 and 2) may be effected without having the bearing come apart. It will be remembered that when each gang and its associated gang frame are assembled for shipment the draft pin 17 is mounted in place and held in position by the clamping bolt 35, but that the draft transmitting members, represented by the parts 15 and 19, are not assembled in position until the harrow is set up by the dealer or farmer. When the harrow is set up it is therefore a relatively simple matter to remove the clamping bolt 35, relying upon the bracket 6 and the bolts 54 and 55 to hold the two bearing parts 21 and 22 together, whereupon the pin 17 may be detached to permit the attachment of the members 15 and 19. The pin 17 is then reassembled in its socket 32, 32 and the bolt 35 replaced and tightened, thereupon not only holding the two bearing halves firmly together but also holding the draft pin 17 in position.

The overhanging bearing sleeve flanges 25 and 26 and the cooperating fins or ribs 27 and 28, in addition to taking end thrust, also serve as lubricant seals, and prevent dirt, dust and the like from entering between the bearing surfaces. To facilitate this action, each of the flanges 25 and 26 is provided with an opening 60 (Figures 3 and 4) communicating with the peripheral sections of the ribs 27 and 28 and provide a convenient escape for any dirt tending to work itself into the bearing.

A modified form of the present invention is shown in Figures 5 and 6. In this form of the invention the same bracket 6 is employed, and likewise the same bearing spool, but a draft pin 17a having a lower threaded end 17b is used. The spool has been omitted from Figures 5 and 6 for purposes of clarity. In the form of the invention shown in Figures 5 and 6 the bearing sleeve is indicated in its entirety by the reference numeral 65 and comprises two parts 66 and 67. Each part is provided with an upper extension 68 which is apertured to receive a clamping bolt 69. In addition, each upper extension 68 is provided with a recess 71 registering with the companion recess in the other part. The recesses 71 are so shaped as to receive a hexagonal nut 73 into which the lower end of the draft receiving pin 17a, which is threaded, may be screwed. Like the bearing structure described above, the two bearing sleeve parts 66 and 67 are formed of exceedingly hard metal so that tapping the parts 66 and 67 directly is not feasible. Additionally, each bearing part 66 and 67 is formed with a recessed section 75 having an open end slot 76. This structure receives the attaching bolts 54 and 55 by which the bracket 6 may be attached to the bearing halves, cooperating with the clamping bolt 69 to hold them in assembled relation. In this form of the invention the draft pin 17a may readily be detached, as for the purpose of assembling the draft bar 15, merely by unscrewing the same from the nut 73.

While I have shown and described above the preferred structure in which the principles of the present invention have been incorporated, it is to be understood that my invention is not to be limited to the particular details shown and described above, but that, in fact, widely different means may be employed in the practice of the broader aspects of my invention.

What I claim, therefore, and desire to secure by Letters Patent is:

1. In a disk harrow, a bearing structure comprising a bearing spool, a bearing sleeve receiving the latter and comprising a pair of separable parts having a generally vertical plane of separation and each part having a bolt-receiving recess, a gang frame bracket having a horizontal portion overlying said recesses and apertured in registry therewith, and bolt means extending through the apertures in said bracket and into said recesses for holding said separable parts together.

2. In a disk harrow, a bearing construction comprising a bearing spool, a bearing sleeve therefor comprising a pair of separable parts having a generally vertical plane of separation and each part having a bolt-receiving recess at its upper side, a substantially U-shaped gang frame bracket having its central portion lying across the upper part of each of said separable parts, and means seated in said recesses and engaging the central portion of said U-shaped bracket for connecting said U-shaped bracket to both of said bearing sleeve parts.

3. In a disk harrow, a bearing construction comprising a bearing spool, a bearing sleeve comprising a pair of separable members, the plane of separation extending generally vertically, a generally upwardly extending gang frame bracket including a portion extending across said bearing, and a pair of separate means interlocked with each of said bearing sleeve parts, respectively, for fixing each bearing sleeve part to said portion of said gang frame bracket.

4. A bearing structure comprising an inner bearing member, an outer bearing member comprising two separable parts, each part having a recess therein, said recesses being adapted to register with one another when the bearing parts are assembled so as to form a part-receiving socket, a detachable part having an end adapted to be received in said socket, and means in said socket engaging said end of the detachable part for holding the latter in said socket.

5. In a disk harrow or the like, a generally U-shaped bracket having a flattened central section with a pair of apertures therethrough, a bearing construction comprising a pair of laterally outwardly facing recessed sections having open end slots in the upper portions thereof, and fastening members, each having an end extending into one of said slotted recesses and means thereon holding said member therein, said fastening members extending through the apertures in and connecting the flattened section of said bracket with said bearing sections.

6. A bearing structure comprising a two-part bearing sleeve, each part having a recess therein, said recesses being adapted to register with one another when the bearing parts are in assembled relation, a fastening member in said registering recesses, and a part extending into said recesses and connected with said fastening member.

7. A bearing structure comprising a two-part bearing sleeve, each part having a recess therein, said recesses being adapted to register with one another when the bearing parts are in assembled relation, a nut member seated in said registering recesses, and a part having a threaded end extending into said recesses and threaded into said nut member.

8. The invention set forth in claim 7, further characterized by a transverse member extending through said bearing sleeve parts adjacent said nut member for securing said sleeve parts together.

9. A bearing structure for disk harrows or the like, comprising a two-part bearing sleeve, each part having a recess therein and said recesses being adapted to register with one another when the bearing sleeve parts are assembled so as to form a part-receiving socket, a draft member, and means for connecting said draft member to said bearing sleeve including a member seated in said socket.

10. The invention set forth in claim 9, further characterized by means for fastening said bearing sleeve parts together, said fastening means engaging the member that connects said draft member with said bearing sleeve.

11. A bearing structure comprising a two-part bearing sleeve formed of non-machinable material and having registering recesses adapted to form a part-receiving socket when said sleeve parts are assembled, a draft member, and means for detachably connecting said draft member with said bearing including a part seating in said socket.

12. A bearing structure comprising a two-part bearing sleeve formed of non-machinable material and having registering recesses adapted to form a part-receiving socket when said sleeve parts are assembled, a draft member, means for detachably connecting said draft member with said bearing including a part seating in said socket, and means for holding said draft member connecting part in said socket.

13. A bearing construction comprising a two-part bearing sleeve having registering recesses forming a part-receiving socket when said sleeve parts are assembled, a draft member, a part receiving said draft member and extending into said socket, and means extending into said socket for holding said part in a position connecting said draft member with said two-part bearing sleeve.

14. A bearing construction comprising a two-part bearing sleeve having registering recesses forming a part-receiving socket when said sleeve parts are assembled, a draft member, a part receiving said draft member and extending into said socket, and means for holding said sleeve parts together including a member extending into said socket and connected with said part for holding the latter in position.

15. In a disk harrow, a bearing construction comprising a bearing spool, a bearing sleeve comprising a pair of separable members, the plane of separation extending generally vertically, a generally upwardly extending gang frame bracket including a portion extending across said bearing, each of said bearing members having a recess therein, said recesses being adapted to register with one another when the bearing members are in assembled relation, separate means fixing each bearing member to said portion of said bracket whereby the latter holds said bearing members together, a detachable fastening member in said registering recesses, and a part extending through said bearing members and into said recesses and connected with said fastening member for holding the latter in place and cooperating with said bracket for holding said bearing members together.

16. In a disk harrow or the like, a bearing construction comprising a bearing spool, bearing sleeve means surrounding said bearing spool and having an enlarged upper section, a pair of transversely spaced sockets disposed in said upper section and having fastener-receiving holes opening upwardly from said sockets, a generally U-shaped frame bracket having a central section with a pair of openings spaced to correspond to the spacing between said fastener-receiving holes, and a pair of fasteners extending through said holes and anchored in said sockets for fixing the central section of said frame bracket to said bearing sleeve means.

17. In a disk harrow or the like, a bearing construction comprising a bearing spool, bearing sleeve means surrounding said bearing spool and having an enlarged upper section adjacent one end of said bearing sleeve means, a pair of transversely spaced sockets disposed in said upper section and having fastener-receiving holes opening upwardly from said sockets, a generally U-shaped frame bracket having a central section with a pair of openings spaced to correspond to the spacing between said fastener-receiving holes, a post-receiving opening disposed substantially midway between the ends of said bearing sleeve means and lying adjacent said sockets and in a generally central vertical plane extending axially of said bearing sleeve means midway between said holes, a generally vertical draft post received in said last mentioned opening, and a draft member apertured to receive the lower portion of said post and connected by the latter to said bearing sleeve means.

CHARLES H. WHITE.

REFERENCES CITED

The following references are of record in the file of this patent:

UNITED STATES PATENTS

| Number | Name | Date |
|---|---|---|
| 585,136 | Todd | June 22, 1897 |
| 1,956,845 | White | May 1, 1934 |
| 2,076,693 | Altgelt | Apr. 13, 1937 |